Patented Aug. 4, 1936

2,050,219

UNITED STATES PATENT OFFICE 2,050,219

PROCESS FOR THE PRODUCTION OF BUTYL ALCOHOL BY FERMENTATION

Cornelius F. Arzberger, Terre Haute, Ind., assignor to Commercial Solvents Corporation, Terre Haute, Ind., a corporation of Maryland No Drawing. Application March 8, 1934, Serial No. 714,633

19 Claims. (Cl. 195—44)

My invention relates to the production of butyl alcohol and other valuable products by the fermentation of sugar-containing solutions. More specifically, my invention relates to the production of normal butyl alcohol, acetone and ethyl alcohol by the fermentation of sugar solutions by means of certain bacteria of the type Clostridium saccharo acetobutylicum hereinbelow described.

It is known that soluble carbohydrate mashes may be successfully fermented by organisms of the general type Clostridium saccharo acetobutylicum. Characteristics of this group of organisms are set forth in copending applications Serial No. 675,459 by Woodruff et al., filed June 12, 1933, and Serial No. 650,736, filed January 7, 1933. The previously known types of bacteria falling in this general group, such as Clostridium saccharo acetobutylicum-alpha have been found to give high yields of solvents from relatively low concentrations of carbohydrate in the mash. The yields, however, were undesirably low for concentrations of sugar greater than 6%. This has meant that for optimum fermentation the concentration of solvents in the fermented mash is lower than is desirable for most economic recovery. Likewise, the yield of solvents per unit of fermentation equipment is lower than would be possible if optimum fermentations could be secured in higher concentration mashes.

I have now found that such fermentation can be secured by means of hitherto undescribed types of bacteria of the general type Clostridium saccharo-acetobutylicum. With these types of bacteria, and subject to control of the acidity of the mash during the process of fermentation consistent yields above 30% can be obtained in 6% sugar mashes with concentrations of solvents in the fermented mash consistently above 20 grams per liter. It is thus seen that a substantial increase in yield per unit of plant equipment is secured, with a corresponding decrease in cost of recovery of solvents from the fermented mash.

The types of bacteria which are employed in my invention have, in addition to the characteristic of fermenting high concentration mashes, a second characteristic which facilitates their identification and isolation. This is a pronounced chromogenesis ranging from yellow-orange to red. On agar media, the color of the bacterial growth usually ranges from yellow to orange, later changing to a brownish color, whereas, on gelatin media, the growth may become a deep red which may also diffuse into the medium. For the purposes of the present invention, therefore, the types of bacteria to be employed may be briefly defined as bacteria of the type Clostridium saccharo-acetobutylicum characterized by an orange to red chromogenesis and ability to produce high yields (for instance, upwards of 28%) of solvents from mashes containing concentrations of at least 6% of a soluble carbohydrate.

The primary characteristics of the bacteria suitable for use in the present invention are the following:

I. Morphological
    A. Rod-shaped
    B. Spore-forming—Clostridia and Plectridia
    C. Practically indistinguishable from members of the Clostridium butyricum group II. A. Biochemical
    1. Ability to produce yields of butyl alcohol and acetone consistently above 30% on the weight of the sugar from 6% sucrose media or uninverted molasses mashes of the type described herein.
    2. Ability to produce yields of butyl alcohol and acetone consistently above 30% on the weight of the sugar from 6% glucose media with suitable nutrients, or an inverted molasses mash.

B. Nitrogen metabolism
    1. Ability to produce high yields of butyl alcohol and acetone in sugar media containing ammonia as the principal source of nitrogen
    2. Ability to utilize degraded protein (including ammonia) as the sole nitrogen source
    3. Inability to utilize undegraded protein as sole source of nitrogen
    4. Inability to liquefy gelatin or to produce more than slight proteolysis of milk C. Oxygen requirements
    1. Anaerobic D. Temperature range for solvent production
    1. From 24° C. to 40° C., preferably 29° C. to 30° C.

E. Hydrogen ion concentration for solvent production
    1. Final pH of 5.0–6.2, preferably 5.4–5.85

F. Chromogenesis—orange to red.

The characteristics given in the above outline are believed to be sufficient to enable one skilled in the art to identify the types of bacteria included in my invention. The various types coming within the group will naturally vary in minor respects as will be evident from the two examples more fully described below. It is to be understood, therefore, that my invention includes the use of all bacteria having in common the characteristics of the above outline, irrespective of any other properties which they might possess. Prior art organisms as well as newly isolated strains are included in the scope of my invention if they satisfy the requirements of the outline. It will naturally be understood, however, that my invention does not cover the use of prior art organisms except under the specific fermentation conditions described and claimed herein.

Two examples of strains of bacteria coming within the scope of my invention are described below in accordance with the Descriptive Chart of the Society of American Bacteriologists.

Name of organism: *Clostridium saccharo-acetobutylicum-beta*
Source: Soil
I. Morphology
  1. Vegetative cells
     Medium used: Potato-glucose mash: 24 hours at 30° C.
     Form: Short and long rods
     Arrangement: Single and chains
     Limits of length: 3.0–7.3 microns: of diameter 1.3–3.1 microns
     Size of majority: 4.5 x 1.5 microns
     Ends: Rounded
  2. Sporangia: Present
     Medium used: Potato-glucose mash
     Form: Spindled, clavate
  3. Endospores: Present
     Medium used: Potato-glucose mash
     Stain used: Nigrosin
     Location of endospores: Central to terminal
     Form: Ellipsoidal to cylindrical
  4. Motility
     In broth: ++
     On agar: ++
  5. Flagella: Present
  6. Irregular forms: Many
  7. Gram stain: Positive 24 hours
II. Cultural characteristics
  1. Gelatin stab
     Medium used: Glucose gelatin (1% glucose, 0.8% sodium chloride, pH 6.6 to 6.8)
     Incubation temperature: 22° C.
     Age: 30 days
     Growth: Moderate
     Line of puncture: Beaded
     Liquefaction: None
     Degree of liquefaction in 30 days: None
     Medium: Changed to reddish hue due to diffused color from bacterial growth.
  2. Agar colonies
     Medium used: 2% glucose agar containing 0.1% ammonium sulphate
     Incubation temperature: 30° C.
     Age: 3 days
     Growth: Slow
     Form: Circular
     Surface: Smooth
     Elevation: Raised to convex
     Edge: Entire
     Internal structure: Finely-granular
     Color: Yellow to orange
  3. Agar colonies
     Medium used: 2% glucose agar containing 0.1% ammonium sulphate
     Incubation temperature: 30° C.
     Age: 10 days
     Form: Large, irregular
     Surface: Smooth; glistening
     Elevation: Convex
     Edge: Undulate
     Color: Orange to brown
III. Physiology
  1. Temperature relations
     Fermentation temperature range: 24–40° C.
  2. Relation to reaction of medium
     Fermentation pH range: 4.0–7.0
  3. Chromogenesis
     Nutrient gelatin: Reddish pink to deep red.
     Nutrient agar: Yellow-orange to brown
  4. Production of indole
     Medium: Peptone broth
     Age: 96 hours
     Test used: Paradimethylaminobenzaldehyde
     Presence: Absent
  5. Relation to oxygen
     Medium: 2% glucose agar containing 0.1% ammonium sulphate
     Aerobic growth: None
     Anerobic growth: Moderate
     Medium: Molasses mash containing calcium carbonate and ammonium sulphate, in deep tubes
     Aerobic growth: Abundant
     Anaerobic growth: Abundant
  6. Litmus milk
     Reaction: Acid in 3 days
     Acid curd: Slowly formed, 7–14 days
     Peptonization: None at 30 days
     Reduction of litmus:
       Beginning: 1 day
       End: Uncertain due to oxidation of litmus by atmosphere above medium
  7. Nitrate reduction
     Medium: Potato mash (8% containing 1% glucose and 0.1% potassium nitrate)
     Test for nitrites: Alphanaphthylaminesulphanilic acid

| Time | Gas | Nitrites |
|---|---|---|
| 24 hours | + | − |
| 48 hours | + | − |
| 72 hours | − | − |
| 96 hours | − | − |

8. Corn mash fermentation
     Medium: Corn mash (7%) containing 0.2% ammonium sulphate and 0.2% calcium carbonate
     Temperature of incubation: 33° C.
     Age: 68 hours
     Solvent production: 1.9 grams per liter of fermented mash: 2.7% calculated on weight of dry corn
  9. Soluble carbohydrate fermentation
     Medium used: 1.0% carbohydrate
       0.5% peptone
       0.04% $KH_2PO_4$
       0.06% $K_2HPO_4$
       0.03% $(NH_4)_2SO_4$
       0.02% $MgSO_4$
       .001% NaCl
       .001% $MnSO_4$
       .001% $FeSO_4$
       pH adjusted to 6.3

Name of organism: *Clostridium saccharoaceto-butylicum-beta*—Contd.
  Incubation temperature: 30° C.
  Time 72 hours

| Carbohydrate | Gas production * |
|---|---|
| Soluble starch | ++ |
| Dextrin | ++ |
| Raffinose | − |
| Sucrose | +++ |
| Lactose | + |
| Maltose | ++ |
| Glucose | ++ |
| Levulose | +++ |
| Xylose | +++ |
| Mannitol | + |
| Glycerol | ± |
| Dulcitol | − |

\* − Negative; + slight; ++ moderate; +++ abundant.

Name of organism: *Clostridium saccharo-aceto-butylicum-gamma*
Source: Soil
I. Morphology
  1. Vegetative cells
     Medium used: Potato-glucose mash: 24 hours at 30° C.
     Form: Short and long rods
     Arrangement: Single and chains
     Limits of length: 3.6–11.5 microns of diameter 0.9–2.5 microns
     Size of majority: 4.6 x 1.5 microns
     Ends: Rounded
  2. Sporangia: Present
     Medium used: Potato-glucose mash
     Form: Spindled, clavate
  3. Endospores: Present
     Medium used: Potato-glucose mash
     Stain used: Nigrosin
     Location of endospores: Central to terminal
     Form: Ellipsoidal to cylindrical
  4. Motility
     In broth: ++
     On agar: ++
  5. Flagella: Present
  6. Irregular forms: Many
  7. Gram stain: Positive 24 hours
II. Cultural characteristics
  1. Gelatin stab
     Medium used: Glucose gelatin (1% glucose, 0.8% sodium chloride, pH 6.6 to 6.8)
     Incubation temperature: 22° C.
     Age: 30 days
     Growth: Moderate
     Line of puncture: Beaded
     Liquefaction: None
     Degree of liquefaction in 30 days: None
     Medium: Changed to reddish hue due to diffused color from bacterial growth.
  2. Agar colonies
     Medium used: 2% glucose agar containing 0.1% ammonium sulphate
     Incubation temperature: 30° C.
     Age: 3 days
     Growth: Slow
     Form: Circular
     Surface: Smooth
     Elevation: Raised to convex
     Edge: Entire
     Internal structure: Finely-granular
     Color: Yellow to orange
  3. Agar colonies
     Medium used: 2% glucose agar containing 0.1% ammonium sulphate
     Incubation temperature: 30° C.
     Age: 10 days
     Form: Large, irregular
     Surface: Smooth; glistening
     Elevation: Convex
     Edge: Undulate
     Color: Orange to brown
III. Physiology
  1. Temperature relations
     Fermentation temperature range: 24–40° C.
  2. Relation to reaction of medium
     Fermentation pH range: 4.0–7.0
  3. Chromogenesis
     Nutrient gelatin: Reddish pink to deep red
     Nutrient agar: Yellow-orange to brown
  4. Production of indole
     Medium: Peptone broth
     Age: 96 hours
     Test used: Paradimethylaminobenzaldehyde
     Presence: Absent
  5. Relation to oxygen
     Medium: 2% glucose agar containing 0.1% ammonium sulphate
     Aerobic growth: None
     Anaerobic growth: Moderate
     Medium: Molasses mash containing calcium carbonate and ammonium sulphate, in deep tubes
     Aerobic growth: Abundant
     Anaerobic growth: Abundant
  6. Litmus milk
     Reaction: Acid in 3 days
     Acid curd: Slowly formed, 7–14 days
     Peptonization: None at 30 days
     Reduction of litmus:
        Beginning: 1 day
        End: Uncertain due to oxidation of litmus by atmosphere above medium
  7. Nitrate reduction
     Medium: Potato mash (8% containing 1% glucose and 0.1% potassium nitrate)
     Test for nitrites: alphanaphthylamine-sulphanilic acid

| Time | Gas | Nitrites |
|---|---|---|
| 24 hours | + | − |
| 48 hours | + | − |
| 72 hours | − | − |
| 96 hours | − | − |

8. Corn mash fermentation
     Medium: Corn mash (7%) containing 0.2% ammonium sulphate and 0.2% calcium carbonate
     Temperature of incubation: 33° C.
     Age: 68 hours
     Solvent production: 12.2 grams per liter of fermented mash: 17.5% calculated on weight of dry corn
  9. Soluble carbohydrate fermentation
     Medium used: 1.0% carbohydrate
              0.5% peptone
              0.04% KH$_2$PO$_4$
              0.06% K$_2$HPO$_4$
              0.03% (NH$_4$)$_2$SO$_4$
              0.02% MgSO$_4$
              .001% NaCl
              .001% MnSO$_4$
              .001% FeSO$_4$
              pH adjusted to 6.3

Name of organism: *Clostridium saccharo-aceto-butylicum-gamma*—Contd.
Incubation temperature: 30° C.
Time: 72 hours

| Carbohydrate | Gas Production* |
|---|---|
| Soluble starch | ++ |
| Dextrin | ++ |
| Raffinose | +++ |
| Sucrose | +++ |
| Lactose | + |
| Maltose | + |
| Glucose | ++ |
| Levulose | ++ |
| Xylose | + |
| Mannitol | − |
| Glycerol | − |
| Dulcitol | − |

\*—Negative; +slight; ++moderate; +++abundant.

It may be seen from the above examples that these types of bacteria differ only in minor characteristics, especially in carbohydrate fermentation reactions. In the essential characteristics of the outline previously given, these types are identical. It is known to those skilled in the art that many of the characteristics included in the descriptive chart are variable and that different results may be obtained by only slight changes in the media, age of culture, or fermentation conditions. These charts, therefore, are included herein as an aid in identification of the particular types of bacteria and not as an absolute limitation. It is believed that with the aid of the general outline previously given and the above descriptive charts, one skilled in the art can readily identify the beta and gamma types with certainty in spite of slight variations in the minor characteristics of the chart. In any event, a check can be obtained by testing the culture at different intervals and under slightly different fermentation conditions, noting the characteristics which appear most consistently.

The types of bacteria included in my invention are widely distributed in nature and may be isolated from such various sources as soil, rotten wood, grain, corn stalks, river mud, and the like. In view of the characteristics listed above, one skilled in the art may readily isolate these organisms from such sources by known methods of isolation. Of course, as is apparent to one skilled in the art, these organisms cannot be isolated from every sample of material tested. However, if a number of different materials are tried, a good culture will nearly always be secured. Any of the known isolation techniques of this type of organism, such as enrichment in selective media, plating on solid media, single cell isolation, and the like, may be employed. In view of the pronounced chromogenesis of these types, plating on solid media is particularly well adapted to the isolation. A suitable procedure is set forth in co-pending application Serial No. 675,459, referred to above. This procedure may be followed exactly with the exception that in the plating step the colonies to be picked are those showing the chromogenetic property previously described.

The fermentation conditions which are required for consistent optimum yields with the types of bacteria described herein are, briefly, the presence of a soluble carbohydrate as the source of carbohydrate, the presence of degraded protein (including ammonia) as the source of nitrogen, a fermentation temperature of 24° C. to 40° C., preferaby 29–30° C., and the control of the acidity of the mash during the fermentation such that the final hydrogen ion concentration, obtained by the action of the bacteria, falls within the range of pH 5.0 to pH 6.2, preferably 5.5–5.85. Of course, additional known fermentation conditions which are usually employed with any organism of this general type, such as the presence of necessary mineral elements (e. g., phosphates and the like), may be employed in the usual manner known to those skilled in the art; but these will not often be necessary with such materials as cane molasses.

The control of the hydrogen ion concentration during the fermentation is of primary importance for securing optimum yields. Although the initial hydrogen ion concentration may vary over a considerable range, the final pH obtained by the action of the bacteria must fall within definite limits if consistent high yields of solvents are to be secured. The final pH secured by the action of the bacteria may be controlled by the introduction of certain materials into the mash at the beginning of the fermentation. For example, I have found that if calcium carbonate, barium carbonate, iron carbonate, or other insoluble non-toxic base, is added to the mash in an amount sufficient to neutralize any free acidity then existing, and an amount in excess of this to the extent of about 5–7% on the weight of sugar, the final pH of the fermentation will be found to be within the operative range. Although the various materials mentioned may be satisfactorily used in my process, calcium carbonate has been found, in most cases, to be especially well suited for this purpose, and is to be preferred from an economic standpoint. However, in choosing the material to be employed the composition of the medium should be considered and a material chosen which will not give rise to an undesirable concentration of a particular metal ion, even though generally considered to be non-toxic in character.

The amount to be added in any particular case will of course depend to some extent on the composition of the mash. For example, a mash containing a substantial amount of phosphates, or other material having a buffering action, will require less calcium carbonate than one which is devoid of such materials. Various samples of calcium carbonate will also differ in respect to the amount which is necessary to use, due to the physical properties of the material and also to its chemical properties, as for example, the presence of substantial amounts of lime. In any particular case, preliminary fermentations will enable one skilled in the art to determine the optimum concentration for the calcium carbonate employed. However, in general it may be said that from 3% to 10% on the weight of the sugar, in excess of that required to neutralize the original acidity, will give very satisfactory results. The calcium carbonate or other insoluble base used should, in general, be sufficiently finely divided so that when resting on the bottom of the fermentation vessel they will present a considerable surface to the fermenting mash. When employing this means of controlling the hydrogen ion concentration, undue agitation should be avoided so as to prevent the possibility of fixing too large a percentage of the acids produced in the early stages of the fermentation, and thus undesirably displacing the equilibrium of the fermentation. It should be definitely understood that the purpose of the addition of the basic materials in this process is not to neutralize all the acids produced in the fermentation, but merely to control the hydrogen ion concentration in such a manner that the final pH secured by the action of the bacteria (and not by the action of neutralizing agents) falls within the specified limits.

It is to be understood that this invention is not to be limited to the particular means employed for securing the desired final hydrogen ion concentration. Any equivalents or modifications which would naturally occur to one skilled in the art may, of course, be employed. For example, an accurate pH control may be maintained by continuous or semi-continuous addition of an alkaline material, such as ammonia, during the active stage of the fermentation and until after the "acidity break." However, the mechanical difficulties or procedures of this nature are well known to those skilled in the art. Even a slight over-neutralization at any time during the fermentation will often result in inhibiting further active fermentation for a period of many hours or even days. Consequently, automatic electrometric titration apparatus is most desirable if such a procedure is employed. In any procedure of this nature, the pH should be controlled to approximate that obtained when the specified amounts of insoluble basic materials are employed.

From the standpoint of simplicity of operation, it is preferred to control the acidity of the mash during the fermentation by means of the insoluble materials such as calcium carbonate. It has been found that for a wide range of grades of molasses, approximately 5 to 7% of calcium carbonate or the like, calculated on the weight of the sugar in the mash, secures adequate control of the acidity, whereby the final pH secured by the action of the bacteria falls within the desired limits. This fact may be seen to obviate the necessity for individual treatment of each sample of molasses unless the ultimate possible yield is desired.

The temperature range which has been found to be most suitable for fermentation by the types of bacteria of the present invention is within the limits 28° C. to 32° C. Growth will occur and sometimes active fermentation will take place over a much wider range, but for consistent high yields of solvents from commercial sugar-containing mashes the temperature should be maintained within the range specified, and preferably within the narrower range 29–30° C.

With regard to the necessary nutrients for this fermentation, it may be said that degraded protein nitrogen is essential. As used here and in the appended claims, the term "degraded protein nitrogen" is to be taken as including hydrolytic degradation products such as polypeptides, amino acids, etc., metabolic degradation products such as urea, etc., and the final degradation product, ammonia, and its salts. Although ammonia (or an ammonium compound such as the sulphate, etc.) alone has been found to give satisfactory yields of solvents, it is preferred to use a mixture of ammonia and partially degraded protein materials such as yeast water, steep water, and the like, in order to consistently secure optimum yields. However, very satisfactory results are obtained when using only partially degraded protein material as the nitrogen source. For example, materials such as yeast water, steep water, and the distillery slop from the *Clostridium acetobutylicum (Weizmann)* fermentation have been found to be satisfactory. Although undegraded protein, such as corn gluten, corn germ meal, and the like cannot be utilized as the sole source of nitrogen, small amounts of such materials, in addition to ammonia or partially degraded protein, sometimes produce improved results. Other nutrient materials such as mineral elements, e. g. phosphates and the like, should be present in small amounts as in the case of other known fermentations. However, if crude sugar solutions such as molasses mashes are employed, these materials will usually be found to be present in sufficient amounts. The amount of ammonia or degraded protein to be added will also vary with the raw material used. For example, certain samples of molasses may be found to have sufficient ammonium compounds and other degraded protein so that very little more need be added. In general, it may be said that with cane molasses mashes from 0.7 to 1.7% of $NH_3$ as ammonium sulphate on the weight of the sugar or an equivalent amount of other degraded protein, will give satisfactory results.

A suitable mash for use in the present invention may be prepared by diluting cane molasses to a sugar concentration of about 6%, adding about 0.2% of ammonium sulphate, 0.2% of corn germ meal, and 0.4% of calcium carbonate and sterilizing for 30 minutes at 20 lbs. pressure. Of course, it is well known to those skilled in the art that different samples of molasses vary in a number of respects, such as sugar content, ash content, and the like. These variations naturally change somewhat the mashing procedure in different cases. For example, some samples of molasses may be found to be lacking in sufficient mineral elements such as phosphates and the like. Other samples may be found to be lacking in partially degraded nitrogenous material. Also, there are certain unknown factors present in some types of molasses which make it desirable to use lower concentrations than in the case of other more suitable types. In any particular case, one skilled in the art may determine the special requirements, if any, by preliminary fermentations and may then make such changes as are necessary in the mashing procedure. However, such changes in mashing procedure for various types of molasses will be necessary only to secure the absolute maximum yield. Very satisfactory yields can be secured in practically all cases by means of the procedure outlined above.

The products obtained in the fermentation of a mash such as that just described are normal butyl alcohol, acetone and ethyl alcohol, the yields usually ranging from 28–36% of total solvents on the weight of the sugar. The following solvent ratios are obtained:

Butyl alcohol _____ above 64%; usually 68–73%
Acetone _____ above 18%; usually 26–32%
Ethyl alcohol _____ below 6%; usually 1– 3%

The gases given off during the fermentation consist of carbon dioxide and hydrogen in a ratio of $CO_2/H_2$ of the order of magnitude of 2 to 1.

The following specific examples will serve to illustrate the process of the present invention:

*Example I*

A mash, prepared as described above, was inoculated with 4% of a sixth generation culture of *Clostridium saccharo-acetobutylicum-beta* and incubated at 30° C. for 72 hours. The following yield of solvents was obtained:

| Concentration of sugar in mash | Solvent yield | |
|---|---|---|
| | Grams per liter | Percent calculated on sugar |
| 6.0 | 20.3 | 32.5 |

*Example II*

Mashes were prepared as described above with varying concentrations of sugar. These mashes were inoculated with 4% of a sixth generation culture of *Clostridium saccharo-acetobutylicum-gamma* and incubated at 30° C. for 72 hours. The following solvent yields were obtained in mashes of different concentrations:

| Concentration of sugar in mash | Solvent yield | |
|---|---|---|
| | Grams per liter | Percent calculated on sugar |
| 5.0 | 17.1 | 33.8 |
| 5.5 | 18.4 | 33.2 |
| 6.0 | 20.4 | 33.3 |
| 6.5 | 20.4 | 31.5 |

It is to be understood, of course, that the examples given above by way of illustration, are not to be taken as limiting this invention to the specific materials or methods employed. For example, other sources of soluble carbohydrate may be utilized, as for example, wood sugar, beet molasses, whey, and the like. However, it is preferred to use molasses as the source of carbohydrate since this material is available in the largest quantities, is low priced, and is fairly standard in composition. If raw materials other than molasses are utilized, one skilled in the art may readily make such adjustments in the composition of the media as are necessary to approximate the composition illustrated for molasses. Also, various other sources of degraded protein nitrogen, such as amino acids, urea, and the like, may be employed. One skilled in the art may readily determine by preliminary fermentations the optimum concentration of the particular degraded protein material which it is desired to employ. The hydrogen ion control may also be effected by means of materials other than those specifically mentioned. For example, other non-toxic materials which are substantially water-insoluble may be used, or soluble materials may be used if they are added in such a manner as to simulate the effect of the non-soluble materials in the amounts specified.

In general, it may be said that equivalents and modifications of procedure which would naturally occur to one skilled in the art may be employed without departing from the scope of my invention.

My invention now having been described, what I claim is:

1. A process for the production of normal butyl alcohol, acetone, and ethyl alcohol which comprises effecting the fermentation of a mash containing soluble carbohydrate as the principal fermentable carbohydrate, and degraded protein nitrogen, by means of bacteria of the group *Clostridium saccharo-acetobutylicum* characterized by their orange to red chromogenesis and their ability to produce high yields of solvents from mashes having sugar concentrations at least as high as 6.0%, said fermentation being effected at temperatures from 24° C. to 40° C., while controlling the acidity of the mash during the fermentation, whereby the final hydrogen ion concentration secured by the action of the bacteria falls within the range pH 5.0 to pH 6.2.

2. A process for the production of normal butyl alcohol, acetone, and ethyl alcohol which comprises effecting the fermentation of a mash containing soluble carbohydrate as the principal fermentable carbohydrate, and degraded protein nitrogen, by means of bacteria of the group *Clostridium saccharo-acetobutylicum* characterized by their orange to red chromogenesis and their ability to produce high yields of solvents from mashes having sugar concentrations at least as high as 6.0%, said fermentation being effected at temperatures from 24° C., to 40° C., while controlling the acidity of the mash during the fermentation by the action of non-toxic insoluble basic neutralizing agents, whereby the final hydrogen ion concentration secured by the action of the bacteria falls within the range pH 5.0 to pH 6.2.

3. A process for the production of normal butyl alcohol, acetone, and ethyl alcohol which comprises effecting the fermentation of a mash containing soluble carbohydrate as the principal fermentable carbohydrate, and degraded protein nitrogen, by means of bacteria of the group *Clostridium saccharo-acetobutylicum* characterized by their orange to red chromogenesis and their ability to produce high yields of solvents from mashes having sugar concentrations at least as high as 6.0%, said fermentation being effected at temperatures from 24° C. to 40° C., while controlling the acidity of the mash during fermentation by the action of calcium carbonate, whereby the final hydrogen ion concentration secured by the action of the bacteria falls within the range pH 5.0 to pH 6.2.

4. A process for the production of normal butyl alcohol, acetone, and ethyl alcohol which comprises subjecting a mash containing soluble carbohydrate as the principal fermentable carbohydrate, and degraded protein nitrogen, to the action of *Clostridium saccharo-acetobutylicum-beta*, at temperatures of from 24° C. to 40° C., while controlling the acidity of the mash during the fermentation, whereby the final hydrogen ion concentration secured by the action of the bacteria falls within the range pH 5.0 to pH 6.2.

5. A process for the production of normal butyl alcohol, acetone, and ethyl alcohol which comprises subjecting a mash containing soluble carbohydrate as the principal fermentable carbohydrate, and degraded protein nitrogen, to the action of *Clostridium saccharo-acetobutylicum-beta*, at temperatures of from 24° C. to 40° C., while controlling the acidity of the mash during the fermentation, whereby the final hydrogen ion concentration secured by the action of the bacteria falls within the range pH 5.5 to pH 5.85.

6. A process for the production of normal butyl alcohol, acetone, and ethyl alcohol which comprises subjecting a mash containing molasses as the principal fermentable carbohydrate and an ammonium compound to the action of *Clos-* tridium saccharo-acetobutylicum-beta, at temperatures of from 24° C. to 40° C., while controlling the acidity of the mash during the fermentation, whereby the final hydrogen ion concentration secured by the action of the bacteria falls within the range pH 5.0 to 6.2.

7. A process for the production of normal butyl alcohol, acetone, and ethyl alcohol which comprises subjecting a mash containing molasses as the principal fermentable carbohydrate and an ammonium compound to the action of Clostridium saccharo-acetobutylicum-beta, at temperatures of from 24° C. to 40° C., while controlling the acidity of the mash during the fermentation by the action of non-toxic insoluble basic neutralizing agents, whereby the final hydrogen ion concentration secured by the action of the bacteria falls within the range pH 5.0 to pH 6.2.

8. A process for the production of normal butyl alcohol, acetone, and ethyl alcohol which comprises subjecting a mash containing molasses as the principal fermentable carbohydrate and an ammonium compound to the action of Clostridium saccharo-acetobutylicum-beta, at temperatures of from 28° C. to 32° C., while controlling the acidity of the mash during the fermentation by the action of calcium carbonate, whereby the final hydrogen ion concentration secured by the action of the bacteria falls within the range pH 5.5 to pH 5.85.

9. A process for the production of normal butyl alcohol, acetone, and ethyl alcohol which comprises subjecting a mash containing molasses as the principal fermentable carbohydrate and an ammonium compound to the action of Clostridium saccharo-acetobutylicum-beta, at temperatures of from 28° C. to 32° C., while controlling the acidity of the mash during the fermentation by the action of an amount of calcium carbonate ranging from 3% to 10% calculated on the weight of the sugar in excess of that required to neutralize the initial acidity of the mash.

10. A process for the production of normal butyl alcohol, acetone, and ethyl alcohol which comprises subjecting a mash containing molasses as the principal fermentable carbohydrate and an ammonium compound to the action of Clostridium saccharo-acetobutylicum-beta, at temperatures of from 28° C. to 32° C., while controlling the acidity of the mash during the fermentation by the action of approximately 5% calcium carbonate calculated on the weight of the sugar in excess of that required to neutralize the initial acidity of the mash.

11. A process for the production of normal butyl alcohol, acetone, and ethyl alcohol which comprises subjecting a mash containing soluble carbohydrate as the principal fermentable carbohydrate, and degraded protein nitrogen, to the action of Clostridium saccharo-acetobutylicum-gamma, at temperatures of from 24° C. to 40° C., while controlling the acidity of the mash during the fermentation, whereby the final hydrogen ion concentration secured by the action of the bacteria falls within the range pH 5.0 to pH 6.2.

12. A process for the production of normal butyl alcohol, acetone, and ethyl alcohol which comprises subjecting a mash containing soluble carbohydrate as the principal fermentable carbohydrate, and degraded protein nitrogen, to the action of Clostridium saccharo-acetobutylicum-gamma, at temperatures of from 24° C. to 40° C., while controlling the acidity of the mash during the fermentation, whereby the final hydrogen ion concentration secured by the action of the bacteria falls within the range pH 5.5 to pH 5.85.

13. A process for the production of normal butyl alcohol, acetone, and ethyl alcohol which comprises subjecting a mash containing molasses as the principal fermentable carbohydrate and an ammonium compound to the action of Clostridium saccharo-acetobutylicum-gamma, at temperatures of from 24° C. to 40° C., while controlling the acidity of the mash during the fermentation, whereby the final hydrogen ion concentration secured by the action of the bacteria falls within the range pH 5.0 to 6.2.

14. A process for the production of normal butyl alcohol, acetone, and ethyl alcohol which comprises subjecting a mash containing molasses as the principal fermentable carbohydrate and an ammonium compound to the action of Clostridium saccharo-acetobutylicum-gamma, at temperatures of from 24° C. to 40° C., while controlling the acidity of the mash during the fermentation by the action of non-toxic insoluble basic neutralizing agents, whereby the final hydrogen ion concentration secured by the action of the bacteria falls within the range pH 5.0 to pH 6.2.

15. A process for the production of normal butyl alcohol, acetone, and ethyl alcohol which comprises subjecting a mash containing molasses as the principal fermentable carbohydrate and an ammonium compound to the action of Clostridium saccharo-acetobutylicum-gamma, at temperatures of from 28° C. to 32° C., while controlling the acidity of the mash during the fermentation by the action of calcium carbonate, whereby the final hydrogen ion concentration secured by the action of the bacteria falls within the range pH 5.5 to pH 5.85.

16. A process for the production of normal butyl alcohol, acetone, and ethyl alcohol which comprises subjecting a mash containing molasses as the principal fermentable carbohydrate and an ammonium compound to the action of Clostridium saccharo-acetobutylicum-gamma, at temperatures of from 28° C. to 32° C., while controlling the acidity of the mash during the fermentation by the action of an amount of calcium carbonate ranging from 3% to 10% calculated on the weight of the sugar in excess of that required to neutralize the initial acidity of the mash.

17. A process for the production of normal butyl alcohol, acetone, and ethyl alcohol which comprises subjecting a mash containing molasses as the principal fermentable carbohydrate and an ammonium compound to the action of Clostridium saccharo-acetobutylicum-gamma, at temperatures of from 28° C. to 32° C., while controlling the acidity of the mash during the fermentation by the action of approximately 5% calcium carbonate calculated on the weight of the sugar in excess of that required to neutralize the initial acidity of the mash.

18. A process for the production of normal butyl alcohol, acetone, and ethyl alcohol which comprises subjecting a mash containing soluble carbohydrate as the principal fermentable carbohydrate and an ammonium compound in admixture with partially degraded protein nitrogen, to the action of Clostridium saccharo-acetobutylicum-beta, at temperatures of from 26° C. to 32° C., while controlling the acidity of the mash during the fermentation, whereby the final hydrogen ion concentration secured by the action of the bacteria falls within the range pH 5.0 to pH 6.2.

19. A process for the production of normal butyl alcohol, acetone, and ethyl alcohol which comprises subjecting a mash containing soluble carbohydrate as the principal fermentable carbohydrate and an ammonium compound in admixture with partially degraded protein nitrogen, to the action of *Clostridium saccharoacetobutylicum-gamma*, at temperatures of from 28° C. to 32° C., while controlling the acidity of the mash during the fermentation, whereby the final hydrogen ion concentration secured by the action of the bacteria falls within the range pH 5.5 to pH 5.85.

CORNELIUS F. ARZBERGER.

Certificate of Correction

Patent No. 2,050,219.   August 4, 1936.

CORNELIUS F. ARZBERGER

It is hereby certified that errors appear in the printed specification of the above numbered patent requiring correction as follows: Page 4, first column, line 55, for "of" after "techniques" read *for*; page 7, second column, line 71, claim 18, for "26° C." read *28° C.*; and that the said Letters Patent should be read with these corrections therein that the same may conform to the record of the case in the Patent Office.

Signed and sealed this 27th day of October, A. D. 1936.

[SEAL]

HENRY VAN ARSDALE,
*Acting Commissioner of Patents.*

19. A process for the production of normal butyl alcohol, acetone, and ethyl alcohol which comprises subjecting a mash containing soluble carbohydrate as the principal fermentable carbohydrate and an ammonium compound in admixture with partially degraded protein nitrogen, to the action of *Clostridium saccharo-acetobutylicum-gamma*, at temperatures of from 28° C. to 32° C., while controlling the acidity of the mash during the fermentation, whereby the final hydrogen ion concentration secured by the action of the bacteria falls within the range pH 5.5 to pH 5.85.

CORNELIUS F. ARZBERGER.

Certificate of Correction

Patent No. 2,050,219.   August 4, 1936.

CORNELIUS F. ARZBERGER

It is hereby certified that errors appear in the printed specification of the above numbered patent requiring correction as follows: Page 4, first column, line 55, for "of" after "techniques" read *for*; page 7, second column, line 71, claim 18, for "26° C." read *28° C.*; and that the said Letters Patent should be read with these corrections therein that the same may conform to the record of the case in the Patent Office.

Signed and sealed this 27th day of October, A. D. 1936.

[SEAL]

HENRY VAN ARSDALE,
*Acting Commissioner of Patents.*

Certificate of Correction

Patent No. 2,050,219. August 4, 1936.

CORNELIUS F. ARZBERGER

It is hereby certified that errors appear in the printed specification of the above numbered patent requiring correction as follows: Page 4, first column, line 55, for "of" after "techniques" read *for*; page 7, second column, line 71, claim 18, for "26° C." read *28° C.*; and that the said Letters Patent should be read with these corrections therein that the same may conform to the record of the case in the Patent Office.

Signed and sealed this 27th day of October, A. D. 1936.

[SEAL]

HENRY VAN ARSDALE,
*Acting Commissioner of Patents.*